United States Patent
Hrybyk et al.

(10) Patent No.: US 9,231,924 B2
(45) Date of Patent: Jan. 5, 2016

(54) GESTURE-INITIATED ENCRYPTION USING ERROR CORRECTION CODING

(71) Applicant: Lockheed Martin Corporation, Bethesda, MD (US)

(72) Inventors: Alexander Gregory Hrybyk, Millersville, MD (US); Chris K. Cockrum, Baltimore, MD (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 14/185,018

(22) Filed: Feb. 20, 2014

(65) Prior Publication Data

US 2014/0258706 A1 Sep. 11, 2014

Related U.S. Application Data

(60) Provisional application No. 61/776,551, filed on Mar. 11, 2013.

(51) Int. Cl.
*H04L 29/06* (2006.01)
*H04L 9/08* (2006.01)
*H04L 9/32* (2006.01)
*G06F 21/31* (2013.01)

(52) U.S. Cl.
CPC ............ *H04L 63/0428* (2013.01); *G06F 21/31* (2013.01); *H04L 9/0866* (2013.01); *H04L 9/3231* (2013.01); *H04L 2209/34* (2013.01)

(58) Field of Classification Search
None
See application file for complete search history.

(56) References Cited

U.S. PATENT DOCUMENTS

| | | | | |
|---|---|---|---|---|
| 6,307,956 B1* | 10/2001 | Black | | 382/124 |
| 7,609,862 B2* | 10/2009 | Black | | 382/124 |
| 7,619,618 B2* | 11/2009 | Westerman et al. | | 345/173 |
| 8,228,299 B1* | 7/2012 | Maloney et al. | | 345/173 |
| 2002/0025062 A1* | 2/2002 | Black | | 382/116 |
| 2003/0220876 A1* | 11/2003 | Burger et al. | | 705/50 |
| 2007/0022289 A1* | 1/2007 | Alt et al. | | 713/168 |
| 2009/0271634 A1* | 10/2009 | Boult et al. | | 713/186 |
| 2011/0090541 A1* | 4/2011 | Harper | | 358/474 |
| 2011/0231667 A1* | 9/2011 | Kindarji et al. | | 713/186 |
| 2012/0039469 A1* | 2/2012 | Mueller et al. | | 380/252 |

OTHER PUBLICATIONS

Sandnes, Frode Eika; Zhang, Xiaoli. User Identification based on Touch Dynamics. 2012 9th International Conference on Ubiquitous Intelligence & Computing and 9th International Conference on Automatic & Trusted Computing (UIC/ATC). pp. 256-263. http://ieeexplore.ieee.org/stamp/stamp.jsp?tp=&arnumber=6332006.*

(Continued)

*Primary Examiner* — Jeremiah Avery
(74) *Attorney, Agent, or Firm* — Oblon, McClelland, Maier & Neustadt, L.L.P.

(57) ABSTRACT

Methods and systems for providing gesture-based security are disclosed. For example, a method for establishing secure communications can include receiving one or more human gestures using a sensor on a first device, quantizing the one or more human gestures so as to create a metric of the one or more human gestures, performing an error correction operation on the metric using error correction information derived from a template of the metric to create a corrected metric, performing a hashing operation on the corrected metric to create a metric hash, and comparing the metric hash to a hash of the template to verify that the one or more human gestures sufficiently conform to the template.

23 Claims, 9 Drawing Sheets

(56) References Cited

OTHER PUBLICATIONS

Matyas, Vashek; Riha, Zdenek. Security of Biometric Authentication Systems. 2010 International Conference on Computer Information Systems and Industrial Managment Applications (CISIM). pp. 19-28. http://ieeexplore.ieee.org/stamp/stamp.jsp?tp=&arnumber=5643698.*

Nonaka, Takako. Uesugi, Yuta; Hase, Tomohiro. Secure Personal Authentication System for Home Network. 2010 10th International Conference on Intellilgent Systems Design and Applications (ISDA). pp. 1361-1364. http://ieeexplore.ieee.org/stamp/stamp.jsp?tp=&arnumber=5687099.*

Feng, Tao; Liu, Ziyi; Kwon, Kyeong-An; Shi, Weidong; Carbunar, Bogdan, Jian, Yifei; Nguyen, Nhung. Continuous Mobile Authentication Using Touchscreen Gestures. 2012 IEEE Conference on Technologies for Homeland Security (HST). pp. 451-456. http://ieeexplore.ieee.org/stamp/stamp.jsp?tp=&arnumber=6459891.*

International Search Report and Written Opinion issued Jul. 28, 2014 in PCT/US2014/017314.

Emanuele Maiorana, et al., "User adaptive fuzzy commitment for signature template protection and renewability", Journal of Electronic Imaging, vol. 17, No. 1, XP-055129893, Jan.-Mar. 2008, pp. 011011-1-011011-12.

Chiara Ercole, et al., "Iris-based authentication system with template protection and renewability", Optics and Photonics for Counterterrorism and Crime Fighting III, Proc. of SPIE, vol. 6741, 67410H, XP-040246931, 2007, 8 Pages.

David González Martínez, et al., "Secure crypto-biometric system for cloud computing", 1st International Workshop on Securing Services on the Cloud (IWSSC), IEEE, XP-032063713, 2011, pp. 38-45.

\* cited by examiner

GESTURE-INITIATED ENCRYPTION USING ERROR CORRECTION CODING

INCORPORATION BY REFERENCE

This application claims the benefit of U.S. Provisional Application No. 61/776,551 entitled "Gesture-initiated Encryption Algorithm using Forward Error Correction" filed on Mar. 11, 2013, the content of which is incorporated herein by reference in its entirety.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

A password is a commonly used starting point for an encryption key. Since a password is typically familiar to a user and will not change in the immediate future, it can be hashed and stored on a medium to essentially hide it in plain sight. The amount of entropy in a password can be very low if the password is not of significant complexity and length. While one can simply increase the length and complexity of a password to increase its entropy, the tradeoff is that longer and more complex passwords are harder to remember. Hence, people typically choose simpler passwords which are easily cracked.

SUMMARY

Various aspects and embodiments of the invention are described in further detail below.

In an embodiment, a method for establishing secure communications includes receiving one or more human gestures using a sensor on a first device, quantizing the one or more human gestures so as to create a metric of the one or more human gestures, performing an error correction operation on the metric using error correction information derived from a template of the metric to create a corrected metric, performing a hashing operation on the corrected metric to create a metric hash, and comparing the metric hash to a hash of the template to verify that the one or more human gestures sufficiently conform to the template.

In another embodiment, a method for creating a password includes receiving a set of one or more human gestures using a sensor on a first device a plurality of times to create a plurality of entries, wherein for each entry the one or more human gestures generally conform with one another, quantizing each entry to create a plurality of metric entries, and deriving a template using the plurality of metric entries such that the template is a statistical amalgam of the plurality of metric entries.

In yet another embodiment, a device for establishing secure communications includes quantizing circuitry configured to quantize one or more human gestures so as to create a metric of the one or more human gestures, error correction circuitry configured to perform an error correction operation on the metric using error correction information derived from a template of the metric to create a corrected metric, hashing circuitry configured to perform a hashing operation on the corrected metric to create a metric hash, and verification circuitry configured to compare the metric hash to a hash of the template to verify that the one or more human gestures sufficiently conform to the template.

In yet another embodiment, a device for creating a password includes a sensor capable of deriving a set of one or more human gestures a plurality of times to create a plurality of entries, wherein for each entry the one or more human gestures generally conform with one another, quantizing circuitry configured to quantize each entry so as to create a plurality of metric entries, and template circuitry configured to derive a template using the plurality of metric entries such that the template is a statistical amalgam of the plurality of metric entries.

BRIEF DESCRIPTION OF THE DRAWINGS

Various embodiments of this disclosure that are proposed as examples will be described in detail with reference to the following figures, wherein like numerals reference like elements, and wherein.

DETAILED DESCRIPTION OF EMBODIMENTS

The disclosed methods and systems below may be described generally, as well as in terms of specific examples and/or specific embodiments. For instances where references are made to detailed examples and/or embodiments, it is noted that any of the underlying principles described are not to be limited to a single embodiment, but may be expanded for use with any of the other methods and systems described herein as will be understood by one of ordinary skill in the art unless otherwise stated specifically.

Figure 1:
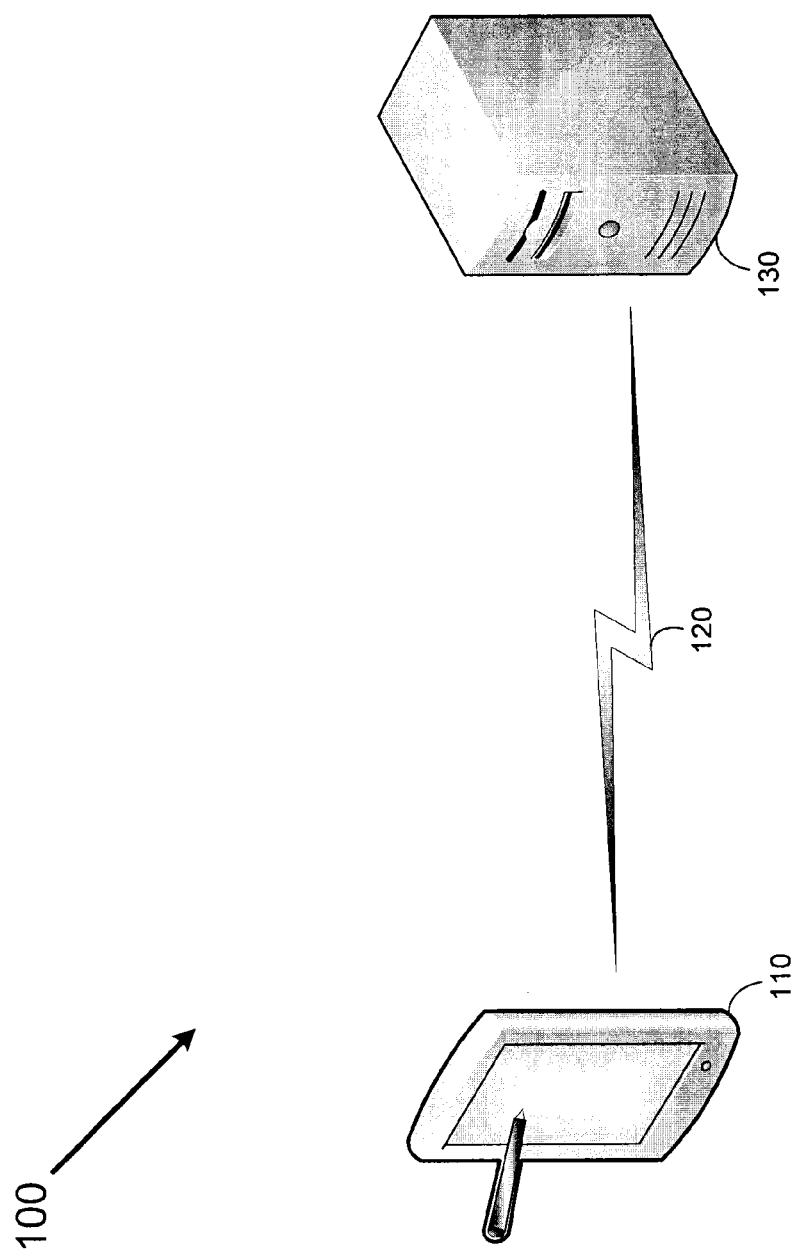
FIG. 1 is a wireless system capable of providing a secure log-in using a graphic-based password system.

FIG. 1 depicts a communication system 100 usable to provide secure communications using a gesture-based password. As shown in FIG. 1, the communication system 100 includes a user terminal 110 coupled to a server 130 via an electronic communications link 120. While the user terminal 110 depicted in FIG. 1 is a tablet computer having a wireless interface, it is to be appreciated that the communication device 110 can take a large number of forms, including any of a large number of smart phones, tablets, laptop computers and other computers as long as such forms include an appropriate set of sensors, such as a touch screen, capable of sensing/measuring human gestures.

While the communication system 100 of FIG. 1 is depicted as a two-part system, in various embodiments the techniques described below can be applied so as to provide passwords for the user terminal 110 alone such that a user can secure access to his tablet computer, smart phone or other device.

Figure 2A:
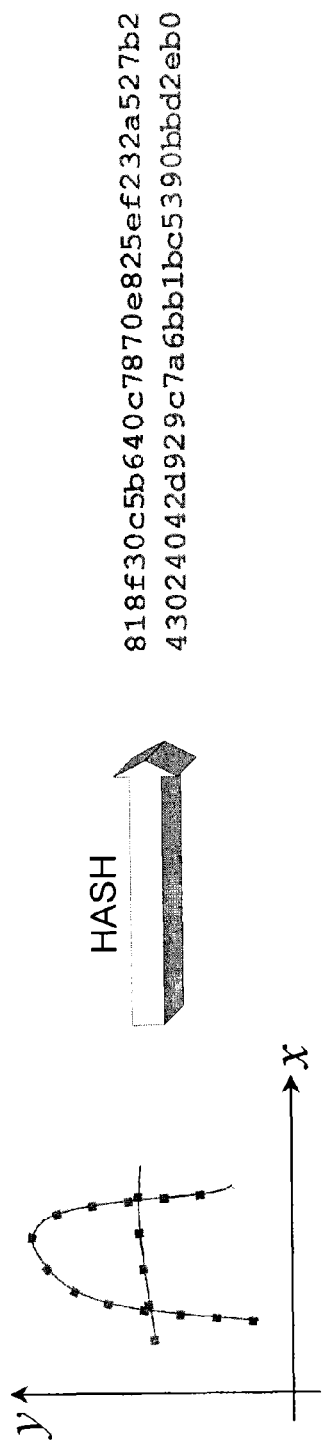
FIGS. 2A and 2B depict different hashes that result from minor variances of similar hand-drawn gestures.
Figure 2B:
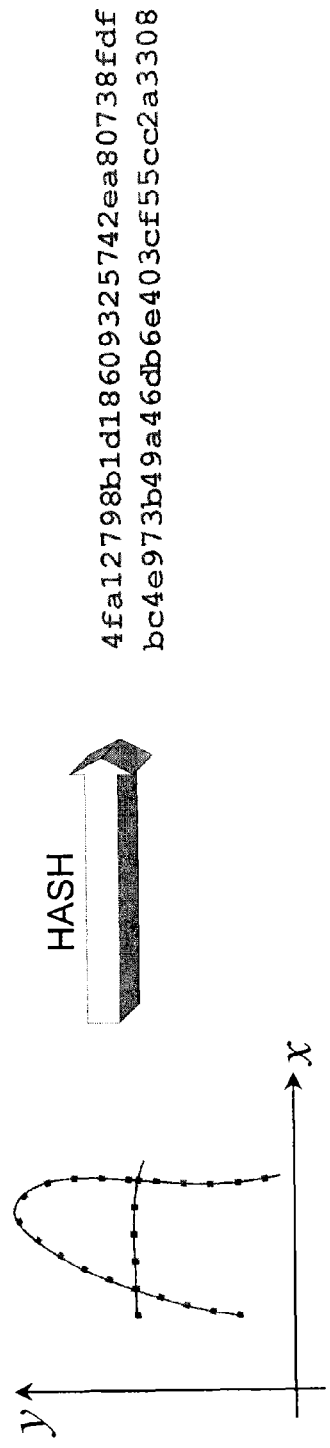

FIGS. 2A and 2B depict different hashes that result from minor variances of similar hand-drawn gestures. Hashing is a well-known technique for storing passwords while minimizing the probability that individual passwords will be exposed to theft. As shown on the left-hand sides of both FIGS. 2A and 2B, a hand-drawn letter "A" is provided with small differences between the two. As also shown in FIGS. 2A and 2B, quantizing and hashing each entry of the letter "A" results in completely different hash values, thereby making hand-drawn gestures an unlikely candidate for passwords given that humans can rarely, if ever, exactly reproduce a drawn gesture. However, in order to form an invariant hash, the information extracted from the gesture must be 100% exact. To address the reproducibility issue, as will be explained below, a Forward Error Correction (FEC) algorithm can be used to correct small amounts of error in feature vectors extracted from a gesture to produce an invariant key/password that can be used for encryption and/or access.

Figure 3:
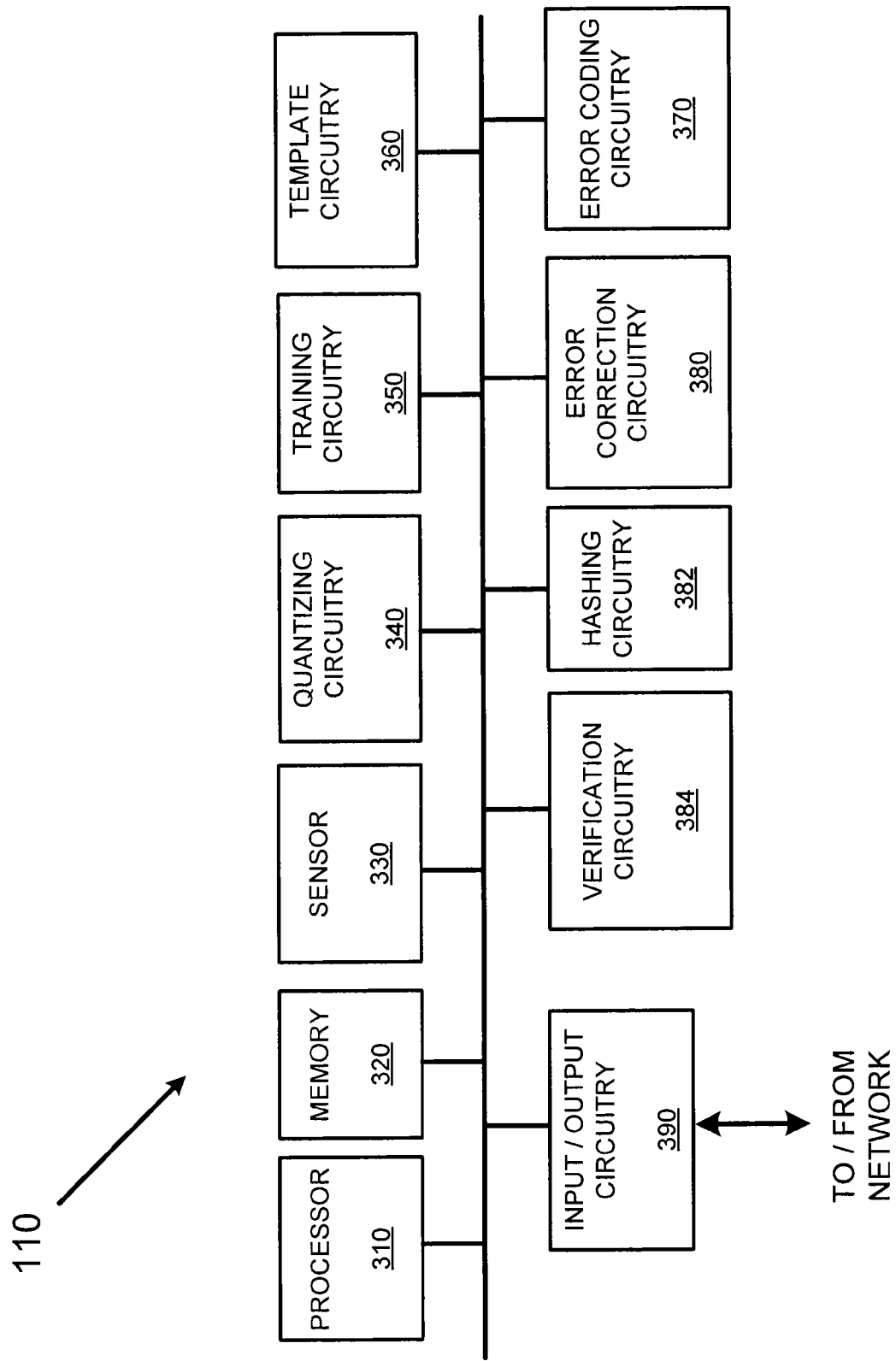
FIG. 3 is a block diagram of a user terminal capable of deriving a gesture-based password, and for securely logging onto a system using human-based gestures.

FIG. 3 is a block diagram of the user terminal 110 of FIG. 1 capable of securely accessing data using human-drawn gestures. As shown in FIG. 3, the user terminal 110 includes a processor 310, a memory 320, a sensor 330, quantizing circuitry 340, training circuitry 350, template circuitry 360, error coding circuitry 370, error correction circuitry 380, hashing circuitry 382, verification circuitry 384 and input/output circuitry 390.

Although the user terminal 110 of FIG. 3 uses a bussed architecture, it should be appreciated that any other architecture may be used as is well known to those of ordinary skill in the art. For example, in various embodiments, the various components 310-390 can take the form of separate electronic components coupled together via a series of separate busses. Still further, in other embodiments, one or more of the various components 310-390 can take form of separate processing systems coupled together via one or more networks. Additionally, it should be appreciated that each of components 310-390 advantageously can be realized using multiple computing devices employed in a cooperative fashion.

It also should be appreciated that some of the above-listed components 340-380 can take the form of software/firmware routines residing in memory 320 and be capable of being executed by the processor 310, or even software/firmware routines residing in separate memories in separate computing systems being executed by different controllers. Still further, it is to be appreciated that some of the above-listed components 340-380 can reside on a completely different platform, such as the server 130 of FIG. 1 or some other device.

In a first series of operations, the user terminal 110 can be used to create a gesture-based password than can be variant from user-entry to user-entry, yet for each user entry an invariant password and hash will be created. Under control of the processor 310, the sensor 330 can measure/receive one or more hand-drawn gestures of a user. Since a gesture's coordinates will likely vary slightly each time the user draws it, the gesture must first be quantized into discrete components to be manipulated.

Accordingly, the quantizing circuitry 340 is used to quantize gestures measured/received by the sensor 330. One possible approach to characterizing a gesture, which involves interpolation and discrete angle quantization, is provided below. However, the example below is just one of many possible quantization approaches, and therefore to be considered a non-limiting example.

A gesture, G, with N points can be described according to Eq. (1) below:

$$G = [x_i, y_i, t_i], i = [0, 1, 2, \ldots N-1];$$ Eq. (1)

where $x_i$ and $y_i$ are Cartesian coordinates for a point I, and $t_i$ is a relative time occurrence for point i.

A given gesture can be interpolated to have a very large constant number of points, M>>N.

$$\hat{G} = [\hat{x}_j, \hat{y}_j, \hat{t}_j], j = [0, 1, 2, \ldots M-1];$$ Eq. (2)

The new interpolated gesture on M points can then be evenly grouped into a constant number (D) of sections $\hat{S}$ such that:

$$\hat{S}_k = [\hat{x}_m, \hat{y}_m, \hat{t}_m]$$ Eq. (3)

$$m = [kM/D, kM/D+1, kM/D+2, kM/D+n \ldots, kM/D+M/D-1]$$ Eq. (4)

$$k = [0, 1, 2, \ldots, D-1]$$

$$n = [0, 1, 2, \ldots, M/D-1]$$ Eq. (5)

where $\hat{y}_j, \hat{x}_j, \hat{t}_j$ are averages of $y_j$, $x_j$ and $t_j$ for a plurality of gesture entries.

For the purposes of this document, the set of sections developed by equations (1)-(5) are referred to as a "metric" of a gesture.

The angle $\theta_{k,m}$ between two points $\{m, m+1\}$ in sections k is determined according to Eq. (6) below:

$$\theta_{k,m} = \tan^{-1}\left(\frac{\hat{S}_k[y_{m+1}] - \hat{S}_k[y_m]}{\hat{S}_k[x_{m+1}] - \hat{S}_k[x_m]}\right)$$ Eq. (6)

Returning to FIG. 1, assuming that a user wishes to create a new gesture-based password, the training circuitry 350 first determines whether the pictogram created by a user is a suitable candidate for a password or encryption key. The criteria for such a determination can vary, but such criteria may include, for example, whether there pictogram is too simple, e.g., a single vertical line; whether the pictogram is too complex; and so on. Assuming that an acceptable pictogram is selected, the user can re-enter the pictogram N times so that the training circuitry can determine whether the pictogram can be reliably re-created by the user. The particular criteria for determining consistency can include, for example, whether angles between points consistently fall within an acceptable error range, whether a total angular error for all points is acceptable, and so on.

Assuming that the training circuitry 350 determines that a pictogram is acceptable and can be reliably reproduced, the template circuitry 360 creates a template of the metrics of the gestures used to create the desired pictogram. To do this, the training circuitry 350 can employ some statistical amalgam of the metrics, such as use average angles between points, use median angles between points, or use any other statistical data capable of embodying a likely representation of some idealized or likely metric of the gestures.

Assuming that average angles are used, the average angle $\Theta$ for each section k of equations (5)-(6) is determined according to Eq. (7) below:

$$\Theta = [\theta_k] = \frac{1}{M/D} \sum_{m=0}^{M/D-1} \theta_{k,m}$$ Eq. (7)

Once determined, the average angles are quantized into the appropriate level given a quantization level count, L, according to Eq. (8) below:

$$\hat{\Theta} = \text{floor}([\theta_2]/L)$$ Eq. (8)

The compilation all of the average angle metrics forms the template, which may be used as the basis of a password or encryption key.

To better protect the template, the hashing circuitry 382 can perform a hashing operation on the template to create a template hash. The template hash can then be stored in the memory 320 or the memory of another device, such as the server 130 of FIG. 1.

Next, the error coding circuitry 370 encodes the template using any number of error coding techniques, such as Reed-Solomon block coding, which will create a set of error detection and correction bits that, when applied to gestures that resemble the template, will enable a device to transform individual gesture entries into the template.

One can view the problem of recognizing a gesture as analogous to correcting distorted data that has passed through a non-ideal data channel. The template is considered an error-free message. However, when the error-free message is sent through a channel (e.g., the touch screen of a tablet), the error-free message is subjected to error/distortion. Error coding allows a designer to redundantly encode data so that the error-free data can be reproduced. The Reed-Solomon technique, which is commonly used to correct errors in scanning bar codes, as well as reading CD and DVD media, provides one non-limiting example of redundant coding. Reed-Solomon uses block codes; meaning, the message to be transmitted is divided up into separate blocks of data. Each block then has error correction information added to it to form a self-contained code word. For each two bits of error correction information added, one symbol can be corrected in the template.

The error correction information can then be stored in the memory 320 or within some other device for later use. When this error correction information is applied to a gesture closely resembling the template, the gesture will be transformed to resemble the template. The amount of difference between a given gesture and a template that can be tolerated depends on the number of error correction bits. The more error correction bits allocated, the greater the variation among gestures that can be tolerated.

Once the template hash and the respective template error correction information have been determined, the user can then employ the user terminal 110 to recognize gesture-based passwords and encryption keys. In such an exemplary operation, the sensor 330 measures/receives a hand-drawn set of one or more gestures from a user, which are then quantized by the quantizing circuitry 340.

Once quantized, the error coding circuitry 370 can create data blocks using the quantized gestures and the error correction information previously derived using the template. The data blocks can then be transmitted to a remote device if desired, or the error-correction circuitry 380 can then perform an error correction operation on the quantized gesture data in order to attempt to re-create the template.

Once the error correction operation is performed, the hashing circuitry 382 can them perform a hashing operation on the "corrected" data to create a hash of the gesture. The verification circuitry 384 can compare the gesture hash to the template hash. If there is a match, then the verification circuitry 384 can provide the appropriate access to the user.

Figure 4:
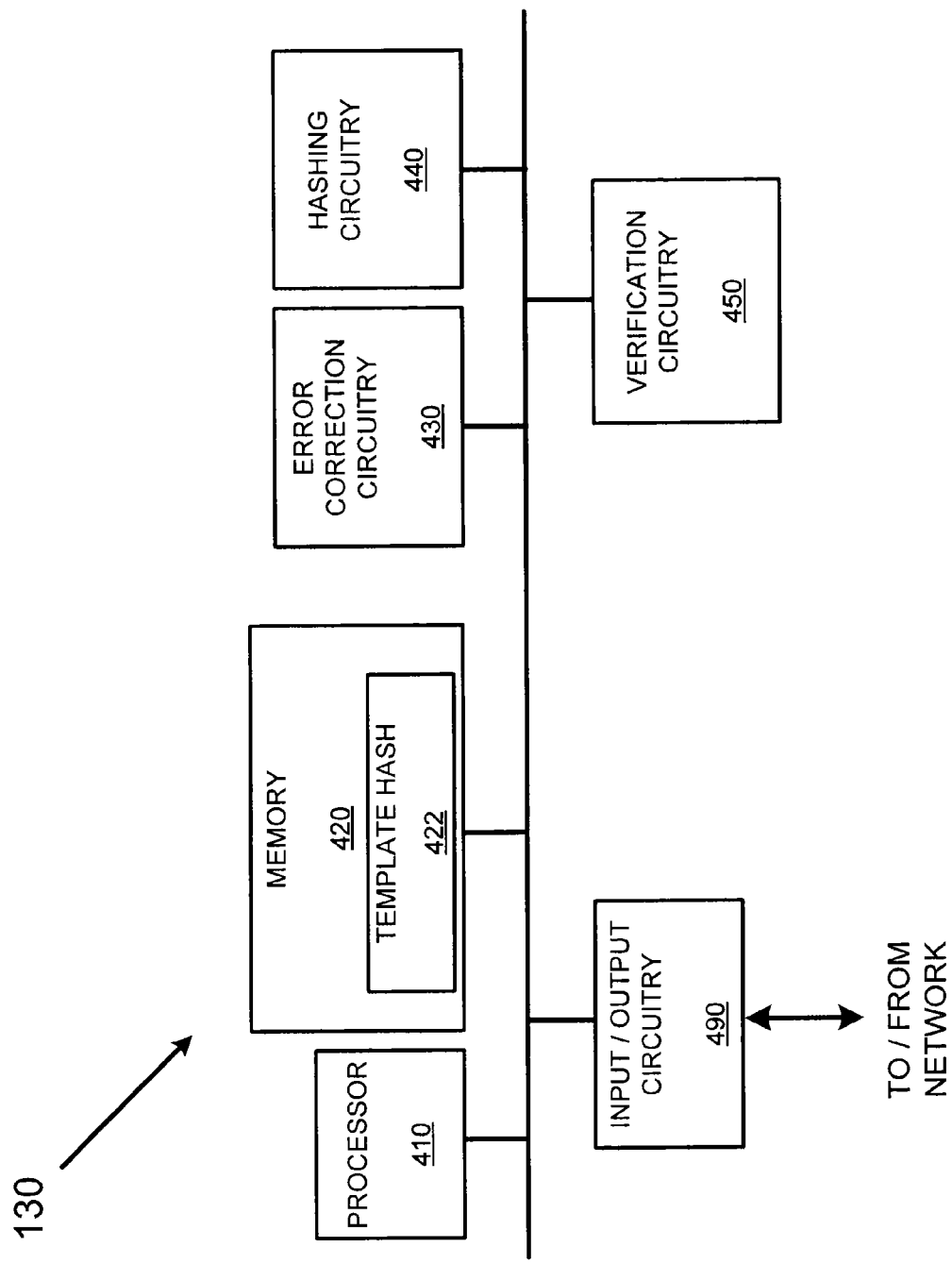
FIG. 4 is a block diagram of a server capable of receiving and verifying a gesture-based password.

FIG. 4 is a block diagram of the server 130 of FIG. 1 capable of providing securely access based on human-based gestures. FIG. 4 demonstrates that servers and like devices need only minor modifications to hardware or software in order to accommodate the disclosed security techniques. As shown in FIG. 4, the server 130 includes a processor 410, a memory 420, error correction circuitry 430, hashing circuitry 440, verification circuitry 45 and input/output circuitry 990. The memory 420 contains a template hash 422 for a user-drawn set of gestures.

As with the user terminal 110 of FIG. 3, the server 130 of FIG. 4 may be constructed using a large variety of architectures, and some or all of the components 430-450 may take the form of software/firmware routines residing in memory 420.

In operation, one or more blocks of data containing quantized gesture-based data and error correction information/bits from a respective template are received by the input/output circuitry 490 and delivered to the error correction circuitry 430.

The error correction circuitry 430 then performs the appropriate error correction operations, e.g., a Reed-Solomon type error correction, to produce corrected gesture data.

The hashing circuitry 440 can them perform a hashing operation on the corrected data to create a hash of the gesture where after the verification circuitry 450 can compare the gesture hash to the template hash 422 in the memory 420. If there is a match, then the verification circuitry 450 can provide the appropriate access to the user.

Figure 5:
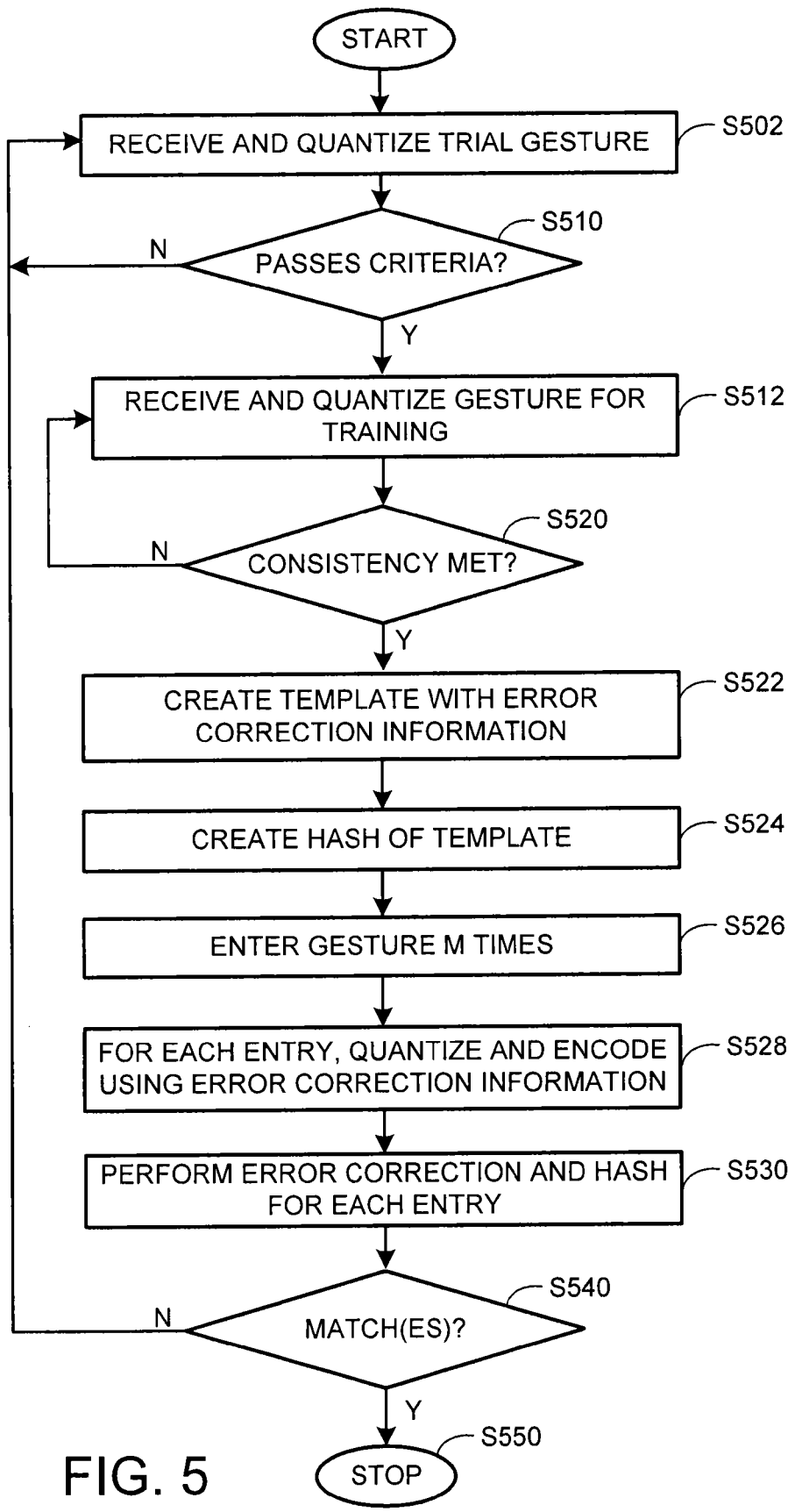
FIG. 5 is a flowchart for creating an invariant password from variant gestures.

FIG. 5 is a flowchart outlining a set of exemplary operations usable for creating an invariant password from human-variant gestures. While the below-described operations are described as occurring in a particular sequence for convenience, it is noted that the order of various operations may be changed from embodiment to embodiment. It is further noted that various operations may occur simultaneously or may be made to occur in an overlapping fashion.

The process starts in at S502 where a human-drawn trial gesture is measured/received using a sensor, and quantized. As discussed above, while gestures can be quantized according to the equations (1)-(6) outlined above so as to embody angular information, other quantization techniques/approaches may be used in other embodiments. Next, at S510, a determination is made as to whether the received gesture is suitable as a password, e.g., it has an appropriate complexity and not previously used. If the received gesture is not suitable, control jumps back to S502 where another trial gesture may be entered; otherwise, control continues to S512.

At S512, the trial gesture of S502 is repeatedly received and quantized for user training to determine whether the user can reliably recreate the gesture. At S520, if the user has not consistently reproduce the desired gesture, control jumps back to S512 where the gesture may be re-entered; otherwise, control continues to S522.

At S522, using the repeatedly entered sets of gestures of S512 and/or using another set of user-supplied gesture entries, a template of the gestures is created, along with the appropriate error correction information usable to transform variant gestures to resemble the invariant template. At S524, a hash of the template is created and stored. Control continues to S526.

At S526, the trial gesture is re-entered by the user M times, and at S528 each gesture entry is quantized and encoded using the error correction information of S522. At S530, error correction and hashing is performed for each of the M entries, and at S540 a determination is made as to whether each gesture hash matches the template hash of S524. If each of the gesture hashes match the template hash, then it is determined that a suitable gesture-based password/key has been found; otherwise, control jumps back to S502.

Figure 6:
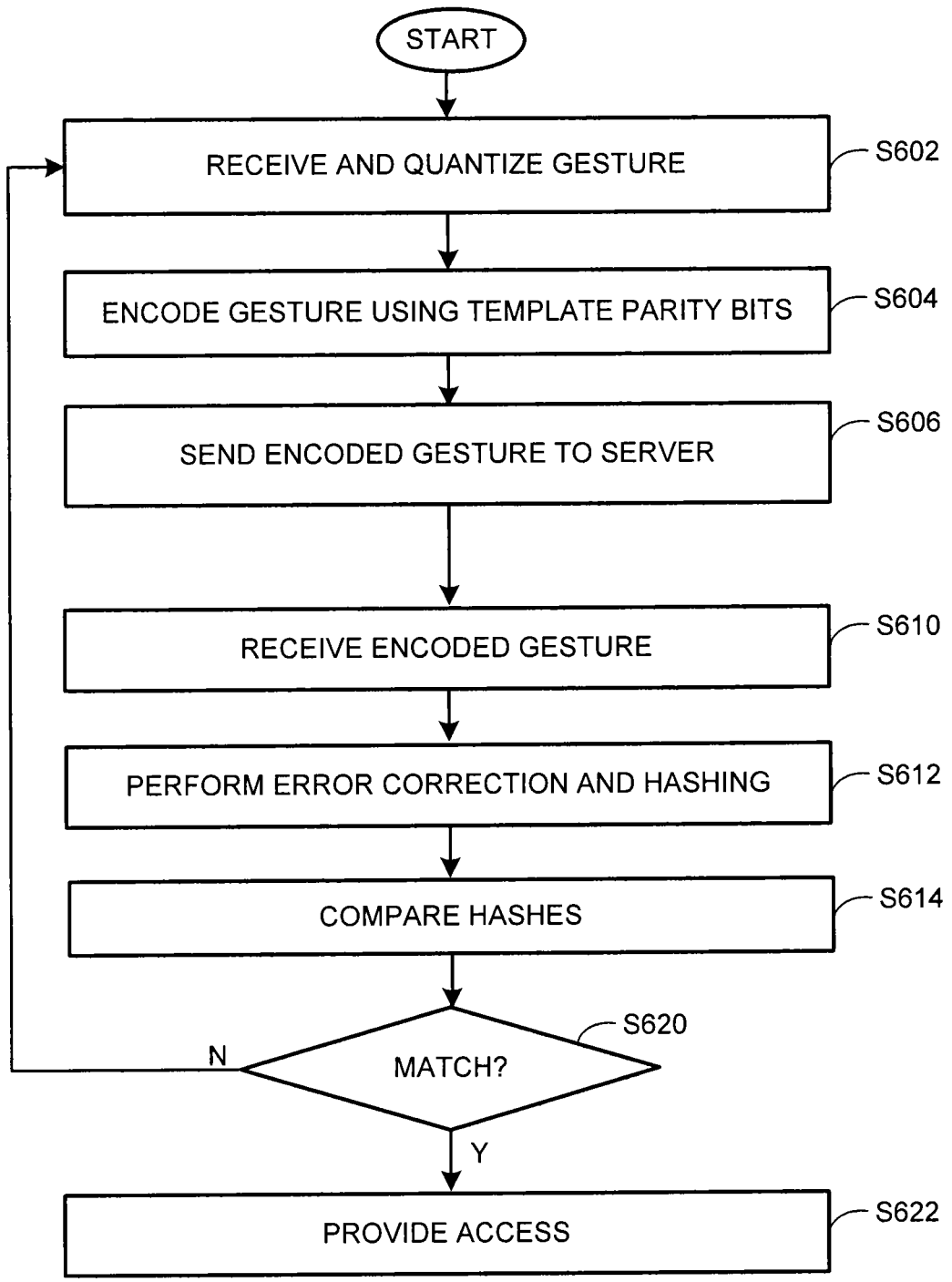
FIG. 6 is a flowchart for securing access to a system using a gesture-based password.

FIG. 6 is a flowchart outlining a set of exemplary operations usable for securing access to a system using a gesture-based password. As with FIG. 5, while the below-described operations are described as occurring in a particular sequence for convenience, it is noted that the order of various operations may be changed from embodiment to embodiment. It is further noted that various operations may occur simultaneously or may be made to occur in an overlapping fashion.

The process starts in at S602 where a human-drawn gesture is received and quantized. Again, as discussed above, while gestures can be quantized according to the equations (1)-(6) outlined above so as to embody angular information, other quantization techniques/approaches may be used in other embodiments. Next, at S604, the quantized gesture is error-coded using the appropriate error correction information derived from a respective template. Control continues to S606.

At S606, the encoded gesture is sent to a server or other remote device, and at S610 the encoded gesture is received. In a variety of embodiments, operations S606 and S610 may be eliminated assuming that the desired access may be had on the device used to receive and quantize the gestures. Control continues to S612.

At S612, error correction and hashing is performed on the gesture to produce a gesture hash. At S614, the gesture hash is compared to a hash of the template, and at S620 a determination is made as to whether the gesture hash matches the template hash. If the gesture hashes match the template hash, then control continues to S622 where access is provided to the user; otherwise, control jumps back to S602.

Figure 7:
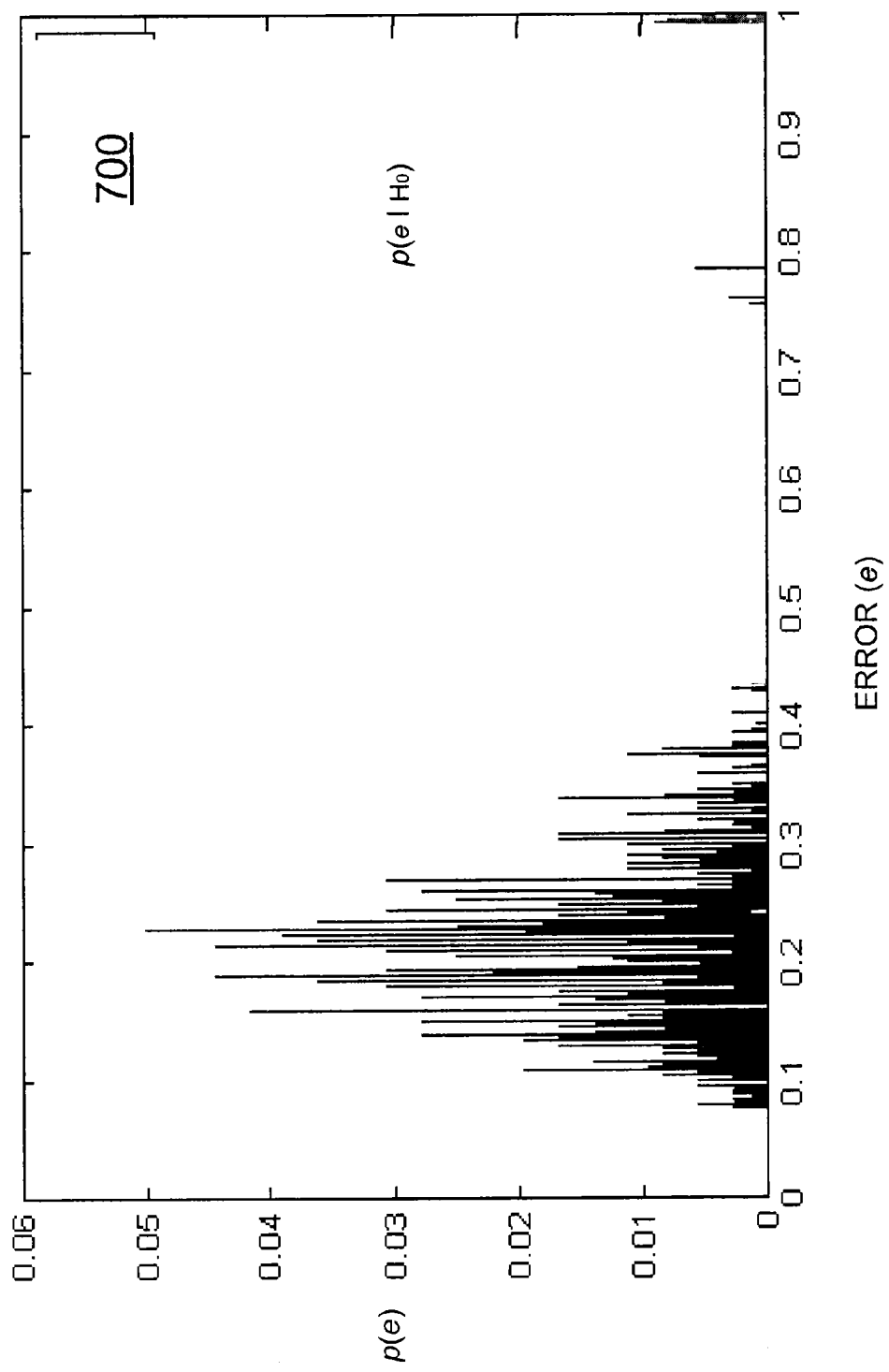
FIG. 7 depicts an analysis of false positives using gesture-based passwords.
Figure 8:
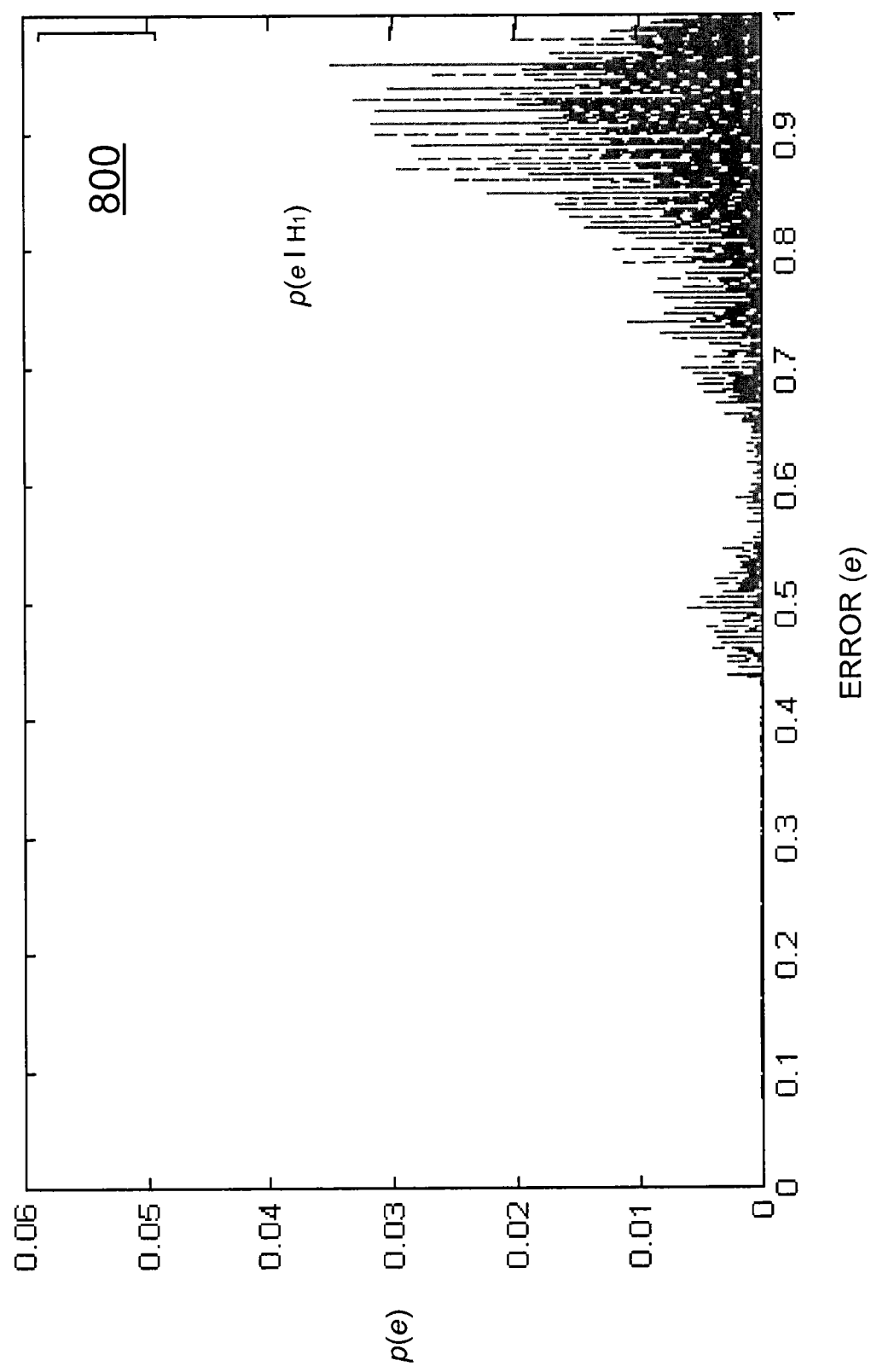
FIG. 8 depicts an analysis of false negatives using gesture-based passwords.

FIGS. 7 and 8 depict an error analysis using gesture-based passwords. In a set of experiments, a group of users drew custom, personalized symbols using a tablet computer. The users then trained the system by drawing their symbol ten times, and gesture templates were created and error-coded. After this, subsequent gestures were quantized and error-coded using the error-correction information for the appropriate template. The distribution of error values were analyzed under two classes.

The first class, shown in graph 700 of FIG. 7, represents the condition that two gesture were drawn by the same person, $p(e|H_0)$, and should reflect a correct match. The second class, shown in graph 800 of FIG. 8, represents the condition that two gestures were drawn by different people, $p(e|H_0)$, and should reflect an incorrect match.

Figure 9:
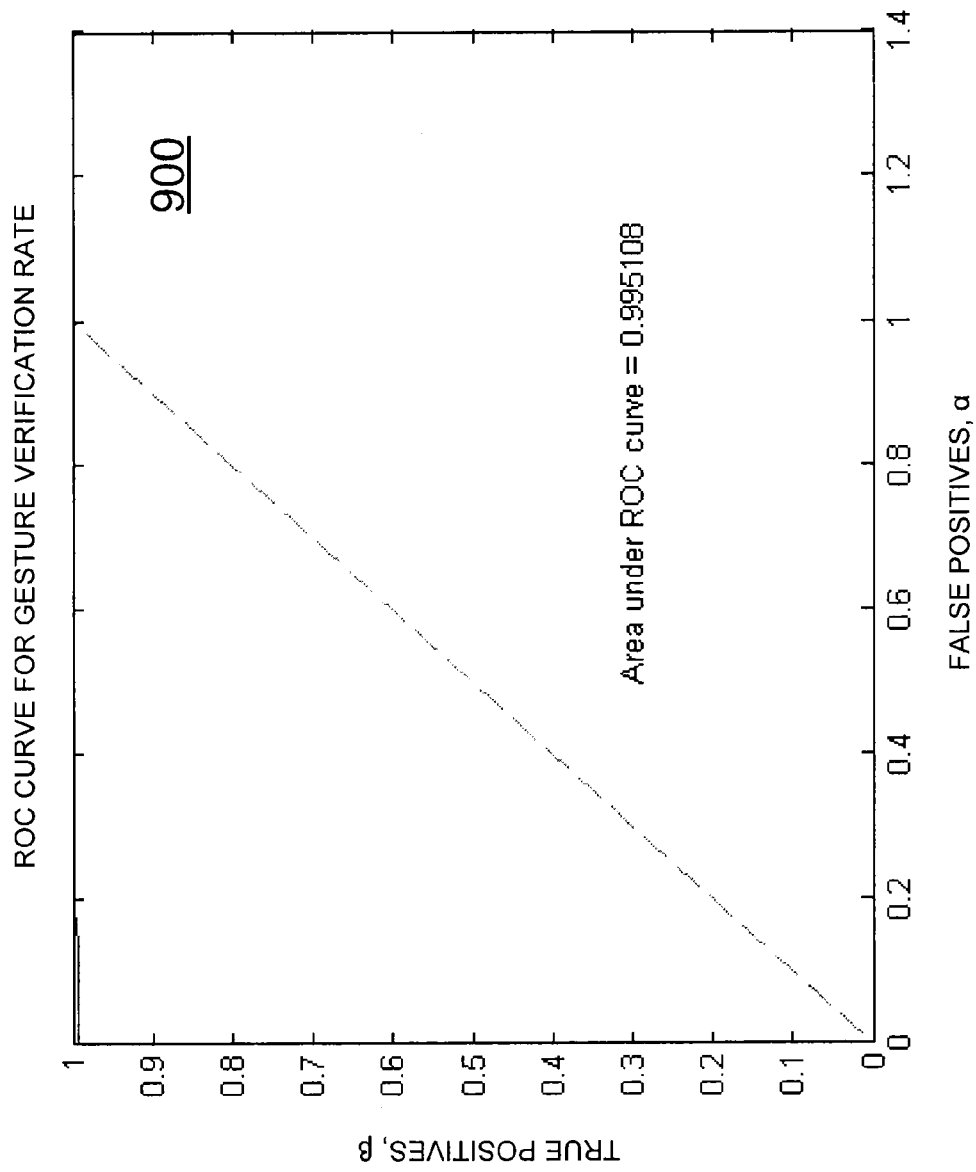
FIG. 9 depicts a performance analysis of gesture-based passwords.

FIG. 9 depicts a receiver operating characteristic (ROC) curve of gesture-based passwords, which depicts how the false rejection rate (FRR) changes given a false acceptance rate (FAR), i.e., the percent of incorrect outcomes that were mistakenly labeled correct. Using a sample set of data from thirty people, a FRR of 0.1% was achieved with 0% FAR. If the error metric was a perfect classifier for the two classes, the two distribution curves in FIGS. 7 and 8 would be completely separated along the x-axis with no overlap, which would yield an area under the ROC equal to 1. In the empirical data there is very little overlap, leading the ROC curve of FIG. 9 to show a high classification accuracy. Setting a false acceptance rate of 0% results in a false rejection rate of 0.1%.

While the invention has been described in conjunction with the specific embodiments thereof that are proposed as examples, it is evident that many alternatives, modifications, and variations will be apparent to those skilled in the art. Accordingly, embodiments of the invention as set forth herein are intended to be illustrative, not limiting. There are changes that may be made without departing from the scope of the invention.

What is claimed is:

1. A method for establishing secure communications, comprising:
    receiving one or more human gestures using a sensor on a first device;
    quantizing the one or more human gestures received from the sensor so as to create a metric of the one or more human gestures by quantizing circuitry;
    performing, by error correction circuitry, an error correction operation on the metric received from the quantizing circuitry using error correction information derived from a template of the metric to create a corrected metric, wherein the metric includes angular information between discrete locations of the one or more human gestures so as to make the one or more human gestures size invariant;
    creating a password based on the corrected metric to establish the secure communications; and
    communicating an error-coded metric to a second device.

2. The method of claim 1, further comprising:
    performing a hashing operation on the corrected metric to create a metric hash.

3. The method of claim 2, further comprising:
    comparing the metric hash to a hash of the template to verify that the one or more human gestures conform to the template.

4. The method of claim 2, further comprising:
    using the metric hash as an encryption key.

5. The method of claim 3, further comprising:
    encoding the metric using the error correction information to create the error-coded metric prior to the communicating;
    wherein
    the error correction operation, the hashing operation and the comparing operation are performed on the second device.

6. The method of claim 1, wherein the one or more human gestures are measured by a touch screen incorporated into the first device.

7. The method of claim 1, further comprising:
    deriving the template using a plurality of gesture entries such that the template is a statistical amalgam of the plurality of gesture entries.

8. A method for creating a password, comprising:
    receiving a set of one or more human gestures using a sensor on a first device a plurality of times to create a plurality of entries, wherein for each entry the one or more human gestures conform with one another;
    quantizing each entry received from the first device to create a plurality of metric entries by quantizing circuitry;
    deriving, by template circuitry, a template using the plurality of metric entries received from the quantizing circuitry such that the template is a statistical amalgam of the plurality of metric entries, wherein each metric entry includes angular information between discrete gesture locations so as to make the one or more human gestures size invariant; and
    creating the password based on the template to establish secure communications with a second device.

9. The method of claim 8, further comprising:
    error-coding the template to derive error-correction information that, when applied to each of the plurality of metric entries, the error-correction information will cause each of the metric entries to transform into the template.

10. The method of claim 8, further comprising:
    before creating the template, determining whether the one or more human gestures are acceptable as a hand-drawn password.

11. The method of claim 10, further comprising:
before creating the template, performing a training routine so as to determining whether the one or more human gestures can be drawn consistently by a user.

12. The method of claim 8, wherein the template includes mean angles of the plurality of metric entries.

13. A device for establishing secure communications, comprising:
quantizing circuitry configured to quantize one or more human gestures so as to create a metric of the one or more human gestures;
error correction circuitry configured to perform an error correction operation on the metric received from the quantizing circuitry using error correction information derived from a template of the metric to create a corrected metric, wherein the metric includes angular information between discrete locations of the one or more human gestures so as to make the one or more human gestures size invariant;
creating a password based on the corrected metric to establish secure communications; and
sending an error-coded metric to a second device.

14. The circuit of claim 13, further comprising:
hashing circuitry configured to perform a hashing operation on the corrected metric to create a metric hash.

15. The circuit of claim 14, further comprising:
verification circuitry configured to compare the metric hash to a hash of the template to verify that the one or more human gestures conform to the template.

16. The circuit of claim 13, further comprising:
encoding circuitry configured to encode the metric using the template error correction information to create the error-coded metric prior to the sending.

17. The circuit of claim 13, further comprising a sensor, wherein the one or more human gestures are derived using the sensor.

18. The circuit of claim 13, wherein the template is a statistical amalgam of a plurality of gesture entries.

19. A device for creating a password, comprising:
a sensor capable of deriving a set of one or more human gestures a plurality of times to create a plurality of entries, wherein for each entry the one or more human gestures conform with one another;
quantizing circuitry configured to quantize each entry created by the sensor so as to create a plurality of metric entries;
template circuitry configured to derive a template using the plurality of metric entries received from the quantizing circuitry such that the template is a statistical amalgam of the plurality of metric entries, wherein each metric entry includes angular information between discrete locations of a respective set of gestures so as to make the one or more human gestures size invariant; and
creating the password based on the template to establish secure communications with a second device.

20. The device of claim 19, further comprising:
error-coding circuitry encode the template to derive error-correction information that, when applied to each of the plurality of metric entries, will enable the metric entries to create a hash that is identical to a hash of the template.

21. The device of claim 19, further comprising:
hashing circuitry to create a hash of the template.

22. The device of claim 19, further comprising:
training circuitry configured to enable a user to perform a training routine so as to determining whether the one or more human gestures can be drawn consistently by the user.

23. The device of claim 19, wherein the template includes mean angles of the plurality of metric entries.

* * * * *